United States Patent
Yan

(10) Patent No.: US 8,586,691 B2
(45) Date of Patent: Nov. 19, 2013

(54) METHOD OF MAKING A BLOCKED POLYMER WITH A SILOXANE LINKING GROUP

(75) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/562,226

(22) Filed: Jul. 30, 2012

(65) Prior Publication Data

US 2013/0035443 A1 Feb. 7, 2013

Related U.S. Application Data

(60) Provisional application No. 61/513,765, filed on Aug. 1, 2011.

(51) Int. Cl.
*C08F 36/00* (2006.01)
*C08G 77/442* (2006.01)

(52) U.S. Cl.
USPC ............ 528/37; 526/279; 526/319; 526/328; 526/335; 526/338; 528/14; 528/25; 528/33

(58) Field of Classification Search
None
See application file for complete search history.

(56) References Cited

U.S. PATENT DOCUMENTS

| | | | |
|---|---|---|---|
| 6,489,262 B2 * | 12/2002 | Zundel et al. | 502/125 |
| 6,558,805 B2 * | 5/2003 | Khadir et al. | 428/447 |
| 2007/0149744 A1 * | 6/2007 | Yan et al. | 528/38 |
| 2010/0252156 A1 * | 10/2010 | Robert et al. | 152/209.1 |
| 2013/0005894 A1 * | 1/2013 | Lopitaux et al. | 524/432 |

FOREIGN PATENT DOCUMENTS

| | | | |
|---|---|---|---|
| GB | 1 376 446 | * | 12/1974 |
| GB | 2 368 069 | * | 4/2002 |

\* cited by examiner

*Primary Examiner* — Marc Zimmer
(74) *Attorney, Agent, or Firm* — Meredith E. Hooker; David G. Burleson

(57) ABSTRACT

Carbanionic polymer chains that contain polyene mer can be provided with a block derived from one or more ethylenically unsaturated functional monomers after being reacted to include, at their respective termini, one or more, although preferably one, unit that is the radical of a cyclic compound, the ring structure of the cyclic compound comprising silicon atoms alternating with O, S or N atoms.

10 Claims, No Drawings

METHOD OF MAKING A BLOCKED POLYMER WITH A SILOXANE LINKING GROUP

CROSS-REFERENCE TO RELATED APPLICATION

This application claims the benefit of U.S. provisional patent application No. 61/513,765, filed Aug. 1, 2011, the entire disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook,* 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. Reduced hysteresis and traction are, to a great extent, competing considerations: treads made from compositions designed to provide good road traction usually exhibit increased rolling resistance and vice versa. Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s).

Certain tests have come to be recognized as correlating certain physical properties of vulcanizates with performance of products, particularly tire treads, made therefrom. For example, reductions in hysteresis (heat build-up during operation) have been found to correlate with higher rebound values and lower loss tangent values (tan δ) at high temperatures, better handling performance with higher elastic modulus values at high temperature and strain, and wet, snow and ice traction with lower modulus values at low temperatures. (In the foregoing, "high temperatures" usually are considered to be from ~50° to ~65° C. while "low temperatures" from ~0° to ~25° C.)

The section of a polymer chain from the site of the last crosslink to an end of the polymer chain is a major source of hysteretic loss; because a free end is not tied to the macromolecular network, it cannot be involved in an efficient elastic recovery process and, as a result, energy transmitted to this section of the polymer (and vulcanizates in which such a polymer is incorporated) is lost as heat. Ensuring that polymer chain ends are tied to, or otherwise interact well with, reinforcing particulate fillers, is important to many vulcanizate physical properties such as, for example, reduced hysteresis. Chemically modifying the polymer, typically at a terminus thereof, is an effective way of increasing interactivity of fillers and polymers.

Cyclic and acyclic siloxanes have been used to provide terminal functionality to living (carbanionic) polymers; see, e.g., U.S. Pat. Nos. 5,811,479 and 6,020,430. This basic concept has been extended in, for example, U.S. Pat. No. 8,063,153, where the still-living siloxane block is used as a site for further reaction so as to provide terminal functionalization, and international appl. no. PCT/US2011/068186 where compounds other than cyclic dialkyl-siloxanes are employed to provide the site for further reaction.

SUMMARY

Provided herein are methods for making polymers with terminal blocks. More specifically, blocks of acrylate-type mer can be provided at a terminus of polymers that include diene mer. Linking the terminal acrylate block to the primary portion of the chain are a small number of silicon atom-containing units.

The method can involve reacting a carbanionic (living) diene-based polymer with a cyclic siloxane-type compound to provide a polymer with a terminal polysiloxane-type moiety, followed by reaction with a sufficient amount of one or more ethylenically unsaturated functional monomers so as to provide a terminal block that includes up to ~100 mer derived from the functional monomer(s).

The resulting end blocked polymer product can be represented by the formula $$E\text{-}A\text{-}B_t \qquad (I)$$

where E is an elastomer, particularly a polymer that includes diene mer; B, is a terminal block that includes up to ~100 mer derived from the functional monomer(s); and A is an intermediate group that contains a small number of silicon atom-containing repeat units.

The compound that reacts with the carbanionic polymer can be a six- or eight-membered cyclic compound that contains repeating siloxane or siloxane-type units, e.g., silazane or hydrosiloxane units. In general, the ring structure of the cyclic compound includes silicon atoms that alternate with either O, S or N atoms. The amount of cyclic compound(s) reacting with the carbanionic polymer can be limited so that, on average, only one such compound reacts with each living polymer chain; the structure of this intermediate, terminally functional living polymer chain is shown below in general formulas (VI), (VIIIa) and (VIIIb).

The polymer chains include polyene mer units. In certain embodiments, the polyenes can be conjugated dienes. In these and other embodiments, where other types of monomers are copolymerized with the polyene(s), the polyene mer can incorporate substantially randomly along the polymer chain. In each aspect, the polymer can be substantially linear.

Compositions, including vulcanizates, that include particulate fillers and end blocked polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"ring system" means a single ring or two or more fused rings or rings linked by a single bond, with the proviso that each ring includes unsaturation;

"terminus" means an end of a polymeric chain;

"terminally active" means a polymer with a living terminus; and

"terminal moiety" means a group or functionality located at a terminus.

Throughout this document, all values given in the form of percentages are weight percentages unless the surrounding text explicitly indicates a contrary intention. All referenced patent documents are incorporated herein by reference.

DETAILED DESCRIPTION OF ILLUSTRATIVE EMBODIMENTS

As summarily described in the previous section, the present method involves adding an acrylate-type end block to living (carbanionic) polymer chains after terminal functionalization with one or more cyclic silicon atom-containing compounds. The polymers include at least one, sometimes only one, terminal moiety resulting from reaction with the cyclic compound, i.e., a terminal unit that is the radical of a cyclic silicon atom-containing compound.

The polymers include mer units derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to ~65%, sometimes can be desirable. A polymer that has an overall 1,2-microstructure of no more than ~50%, typically no more than ~45%, more typically no more than ~40%, even more typically no more than ~35%, and commonly no more than ~30%, based on total polyene content, is considered to be "substantially linear". For certain end use applications, however, keeping the content of 1,2-linkages even lower—e.g., to less than ~7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Useful polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Solution polymerization typically involves an initiator such as an alkali metal atom containing compound such as an organolithium compound, particularly alkyllithium compounds. Examples of organolithium initiators include N-lithio-hexamethyleneimine; n-butyllithium; tri-butyltin lithium; dialkylaminolithium compounds such as dimethylaminolithium, diethylamino-lithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

So-called functionalized initiators also can be useful and sometimes even preferred. These become incorporated into the polymer chain, thus providing a heteroatom-containing functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Other potentially useful functional initiators include sulfur atom-containing cyclic compounds such as those described in U.S. Pat. No. 7,612,144, which are defined by the general formula

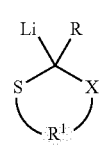

(II)

where $R^1$ is a $C_2$-$C_8$ alkylene group; X is S, O or NR; and R is a substituted or unsubstituted $C_1$-$C_6$ trialkylsilyl group, $C_1$-$C_{20}$ alkyl group, $C_4$-$C_{20}$ cycloalkyl group, $C_6$-$C_{20}$ aryl group, thienyl, furyl, or pyridyl group.

Also potentially useful as functional initiators are cyclic compounds such as those described in U.S. Pat. No. 8,227, 562, defined by the general formula

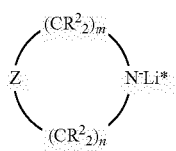 (III)

where each $R^2$ independently is H or a $C_1$-$C_6$ alkyl group; m is an integer of from 0 to 4 inclusive and n is an integer of from 1 to 4 inclusive, with the proviso that m+n≥2; and Z is $NR^3$, $PR^4$, $SiR^4R^5$, $SnR^4R^5$, or $CR^4R^6$ wherein $R^3$ is a substituted or unsubstituted hydrocarbyl group that is free of active hydrogen atoms (but which optionally can include at least one N, P, O, S, Si or Sn atom), $R^4$ is an $R^3$ group which includes at least one N, P, O, S, Si or Sn atom, $R^5$ is a $C_1$-$C_6$ alkyl group, and $R^6$ is $R^2$ or, together with $R^4$ and the C atom to which it is bonded, forms a substituted or unsubstituted cycloalkyl group.

Also potentially useful as functional initiators are compounds such as those described in U.S. Pat. Publ. No. 2010/ 0286348 A1, defined by the general formula

 (IV)

where M is an alkali metal atom, preferably Li, Na or K; $R^7$ is a substituted or unsubstituted aryl group (which can be a single phenyl-type group or a ring system) having at least one $OR^8$ substituent group where each $R^8$ is a group that is non-reactive toward M and capable of being hydrolyzed; Z' is a single bond or a substituted or unsubstituted alkylene (acyclic or cyclic) or arylene group; and Q is a group bonded to M through a C, N or Sn atom.

Also potentially useful as functional initiators are cyclic compounds such as those described in U.S. Pat. Publ. No. 2012/0136128, defined by the general formula

 (V)

where M is an alkali metal atom, preferably Li, Na or K; $R^9$ is an aryl group that includes at least one $OR^8$ substituent group with $R^8$ being defined as above; and $R^3$ is defined as above.

Also potentially useful as functional initiators are para-substituted styrenic compounds that have been reacted with an alkali metal atom-containing compound, which can be represented by formula (V) above with the proviso that $R^9$ here is defined as a phenyl group substituted at the para position with a linear or cyclic group that contains at least one O, S, N, P or Si atom. Non-limiting examples of compounds that can be reacted with an alkali metal atom-containing compound (e.g., a hydrocarbyllithium) include, but are not limited to,

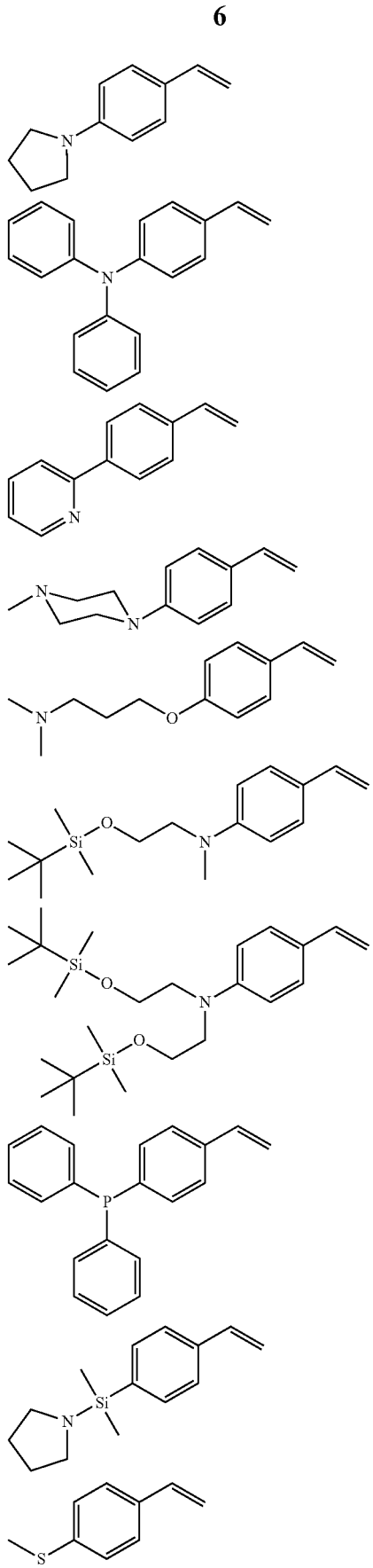

The foregoing are intended to be representative of the types of functional initiators that can be used in certain aspects of the present method.

The amount of initiator employed can vary widely depending on the particular initiator and the desired characteristics of the resulting polymer. For each 100 g of monomer present, sufficient initiator to provide ~0.1 to ~100 mmol alkali metal atom, typically from ~0.33 to ~10 mmol alkali metal atom, is employed.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetra-methylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to ~150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to ~150,000 Daltons.

The aforedescribed polymerization process advantageously results in carbanionic polymer chains that possess reactive (living) terminals, which can undergo further reaction(s) that can enhance the interaction between the polymer chains and particulate fillers in rubber compounds, thereby improving the mechanical and dynamic properties of vulcanizates made therefrom.

One such reaction is accomplished by introducing a cyclic polysiloxane into a vessel that contains a living polymer. (The term "vessel" can be the reactor in which the polymerization was conducted or, if desired, a separate container to which the polymer cement has been transferred.) Examples of cyclic polysiloxanes that can be used in this reaction are those that can deliver up to 6, preferably 3 to 4, repeating siloxane units. Also preferred are those where at least some, preferably all, of the Si atoms are substituted with a $C_1$-$C_6$ organic (preferably hydrocarbyl) substituent, preferably a $C_1$-$C_3$ alkyl group. Particularly preferred due to availability and cost are hexamethylcyclotrisiloxane (H-3S) and octamethylcyclotetrasiloxane (O-4S).

The product of the foregoing reaction can be represented as

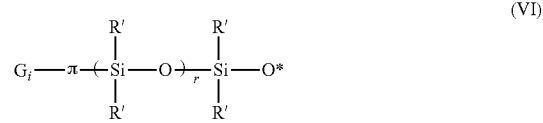

(VI)

where $G_i$ represents the radical of a functional initiator; π represents a polymer chain that includes polyene mer; each R' independently is a $C_1$-$C_6$ organic substituent; and r≥2, typically 2≤r≤19, and preferably 2≤r≤7. In some embodiments, the radical of only a single cyclic siloxane becomes attached to the polymer chain which, in the case of H-3S and O-4S, results in r=2 or r=3, respectively. In these situations, the repeating siloxane units constitute a relatively minor proportion of the overall polymer chain; in general, the repeating siloxane units typically have a collective molecular weight of no more than ~400 g/mol, more typically no more than ~360 g/mol, even more typically no more than ~340 g/mol, and most commonly no more than ~320 g/mol.

Alternatives to cyclic polysiloxanes include cyclic compounds having one of the following formulas

(VIIa)

or

(VIIb)

where s is 3 or 4, Y is an O or S atom, $R^3$ is defined as above, and one of $R^{10}$ and $R^{11}$ is a hydrogen atom and the other is a hydrocarbyl group. (Where $R^{11}$ is H, $R^{10}$ can be $R^3$.) As with the aforedescribed polysiloxances, a silicon atom of this type of cyclic compound is believed to react with a C atom at a polymer chain terminus so as to result in attachment of a ring-opened version of the compound to a terminus of the polymer.

In formulas (VIIa) and (VIIIb), as well as those which precede them, the $R^3$ hydrocarbyl group can be an aryl, (cyclo)alkyl, alkenyl, alkenaryl, aralkenyl, alkaryl, or aralkyl group, most commonly a $C_1$-$C_6$ substituent such as a $C_1$-$C_3$ alkyl group, a $C_5$-$C_6$ cycloalkyl group or a $C_6$ aryl group. The $R^3$ hydrocarbyl group can be substituted (defined above), with non-limiting examples of potentially useful substituted hydrocarbyl groups including $C_1$-$C_6$ alkoxy groups (as well as sulfur analogs) and secondary amino groups.

In both formula VIIIa and VIIb compounds, s is 3 or 4. Accordingly, specific structures of formula VIIIa compounds include:

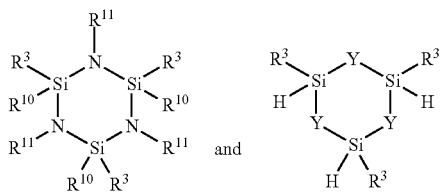 and where Y is an oxygen or sulfur atom. Non-limiting examples of formula VIIb compounds include those having the following structures:

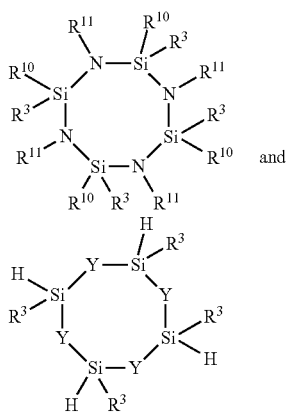 and where, in each structure, one of $R^{10}$ and $R^{11}$ is H and the other is a hydrocarbyl group. In the situation where $R^{11}$ is H, $R^{10}$ also can be a substituted hydrocarbyl group of a scope similar to that set forth above in connection with $R^3$.

Given the foregoing structures and the definitions of the variables, the ordinarily skilled artisan can envision scores of species defined by these structures.

No particularly unusual reaction conditions are believed necessary to accomplish the foregoing reaction, i.e., the conditions used to provide the living polymer typically are adequate to open the ring of the cyclic structure and allow the resulting radical to attach to the polymer terminus. Reaction of the foregoing types of compound with a terminally active polymer can be performed in less than ~100 minutes, often fewer than ~50 minutes, at moderate temperatures. e.g., 0° to 75° C. Reaction typically occurs between a C atom of the polymer chain and a Si atom of the cyclic compound. Because of the reactivity of carbanionic (living) polymers, the molar or equivalent amount of functionalizing compound need be no greater than ~1:1 relative to the amount of initiator employed in the polymerization, although higher ratios certainly can be employed if a larger intermediate moiety (i.e., more than one unit derived from the opening of the cyclic compound and attachment of its radical to the polymer chain) is desired.

The product of a reaction between a formula (VIIa) or (VIIb) compound with a carbanionic polymer can be represented as, respectively,

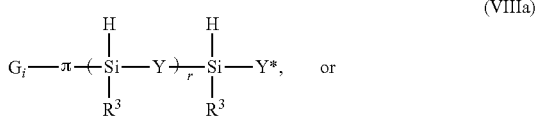 (VIIIa)

or

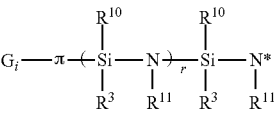 (VIIIa)

where $G_i$, π, r, $R^3$, $R^{10}$ and $R^{11}$ are defined as above. In some embodiments, the radical of only a single formula (VIIa) or (VIIb) compound becomes attached to the polymer chain which, in the case of the specifically exemplified compounds above, results in r=2 or r=3, respectively. In these situations, the repeating silicon atom-containing units constitute a relatively minor amount of the overall polymer chain; in general, the repeating silicon atom-containing units typically have a collective molecular weight of no more than ~500 g/mol, more typically no more than ~400 g/mol, even more typically no more than ~380 g/mol, and most commonly no more than ~360 g/mol.

The radical of a cyclic silicon atom-containing compound provides an anionic terminal moiety capable of further reaction. In the present case, the desired reaction is attachment of one or more types of ethylenically unsaturated functional monomers. To promote reaction at the ethylenic unsaturation and permit chain propagation, such monomers are devoid of hydrogen atoms that are more reactive than the ethylenic unsaturation. To assist in providing interactivity with particulate filler(s), such monomers also include a functionality that includes at least one of Si, O, and N atoms, i.e., those known to promote interaction with carbon black and/or silica fillers.

Exemplary compounds that can be used as ethylenically unsaturated functional monomers include those defined by the general formula

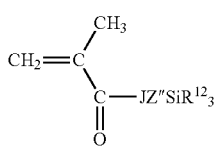 (IX)

where Z" is a single bond or a hydrocarbyl group, preferably a $C_1$-$C_6$ alkyl group; each $R^{12}$ independently is an alkyl or alkoxy group, preferably a $C_1$-$C_3$ alkyl or alkoxy group; and J is an oxygen atom or $NR^{13}$ group where $R^{13}$ is a hydrogen atom or hydrocarbyl group, typically an aryl, (cyclo)alkyl, alkenyl, alkenaryl, aralkenyl, alkaryl, or aralkyl group, most commonly a $C_1$-$C_6$ substituent such as a $C_1$-$C_3$ alkyl group, a $C_5$-$C_6$ cycloalkyl group or a $C_6$ aryl group.

Representative examples of formula (1x)-type monomers include methacryloxy-alkyltrialkoxysilanes, methacryloxy-alkyltrialkylsilanes, and amide analogs thereof.

The number of units provided from ethylenically unsaturated functional monomer(s) can range from 1 to ~100, typically from 1 or 2 to ~75, commonly from 1 or 2 to ~50, more commonly from 1 or 2 to ~25, and most commonly from 1 or 2 to ~10. The number of such units can be tailored by controlling the molar ratio of ethylenically unsaturated functional monomer(s) relative to the molar amount of initiator employed. By way of non-limiting example, where 20 mmol of an alkyllithium compound is utilized to initiate a polymerization, addition of 1 mol of ethylenically unsaturated functional monomer(s) can provide on average 50 units per polymer chain.

Based on the foregoing ranges of the number of units provided from ethylenically unsaturated functional monomers, the molecular weight of the end block ($B_t$) ranges from ~200 to ~20,000, which is relatively small compared to the molecular weight of the polyene (inter)-polymer, specifically 2.5 to 2500 times smaller.

In addition to providing desirable terminal functionalization (which assists in increasing interactivity with particulate fillers when the polymer is compounded, i.e., included in a rubber composition, and formed into a vulcanizate), inclusion of a terminal block of ethylenically unsaturated functional monomers can improve cold flow performance of the polymer.

Although typically not required, if desired, quenching can be conducted by stirring an active hydrogen atom-containing compound, such as an alcohol or acid, into the polymer cement for up to ~120 minutes at temperatures of from ~25° to ~150° C.

Solvent can be removed from the quenched polymer cement by any of a variety of techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any type of tread stock rubber including natural rubber and/or non-functionalized synthetic rubbers such as, e.g., one or more of homo- and interpolymers that include just polyene-derived mer units (e.g., polybutadiene, polyisoprene, and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™215, Hi-Sil™233, and Hi-Sil™190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr. In certain embodiments, the amount of silica relative to the total amount of particulate filler can be below 50%, below ~45%, below ~40%, or even below ~35%.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of $G_f$-T-$G_s$, in which $G_f$ represents a functional group capable of bonding physically and/or chemically with a group on the surface of the silica filler (e.g., surface silanol groups); T represents a hydrocarbon group linkage; and $G_s$ represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the $G_f$ and $G_s$ functionalities mentioned above. An exemplary coupling agent is bis[3-(triethoxysilyl)propyl]-tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

In the following examples, dried glass vessels previously sealed with extracted septum liners and perforated crown caps under a positive $N_2$ purge were used for all preparations unless otherwise indicated.

Butadiene solution (varying percentages in hexane), styrene solution (33.5% in hexane), hexane, n-butyllithium (1.6 M in hexane), 2,2-bis(2'-tetrahydrofuryl)propane (1.6 M solution in hexane, stored over $CaH_2$), and butylated hydroxytoluene (BHT) solution in hexane were used in the polymerizations.

Commercially available reagents and starting materials included the following, all of which were acquired from Acros Organics (Geel, Belgium) and used without further purification unless otherwise noted in a specific example: H-3S, O-4S, and methacryloxypropyltrimethoxysilane (MAPTMS).

Example 1

Interpolymer (Control)

To a $N_2$-purged reactor equipped with a stirrer was added 1.71 kg hexane, 0.45 kg styrene solution, and 2.79 kg butadiene solution (21.5% in hexane). The reactor was charged with ~3.9 mL n-butyllithium solution, followed by 1.2 mL 2,2-bis(2'-tetrahydrofuryl)propane solution. The reactor jacket was heated to 50° C. and, after ~32 minutes, the batch temperature peaked at ~66° C.

After an additional ~30 minutes, polymer cement was dropped into isopropanol containing BHT. Coagulated polymer was drum dried. Properties of this polymer (sample 1) are summarized below in Table 1, where $M_p$ represents peak molecular weight.

Example 2

Interpolymer with Terminal Siloxane Units (Comparative)

The procedure from Example 1 was essentially repeated. To the same type of reactor was added the same amounts of hexane, styrene solution, and butadiene solution. The reactor was charged with ~4.1 mL n-butyllithium solution, followed by 1.2 mL 2,2-bis(2'-tetra-hydrofuryl)propane solution. The reactor jacket was heated to 50° C. and, after ~32 minutes, the batch temperature peaked at ~67° C.

After an additional ~30 minutes, ~6.6 mL H-3S solution (1.0 M in hexane) was added to the reactor. This polymer cement was agitated at 50° C. for another ~30 minutes before being dropped into isopropanol containing BHT, coagulated and drum dried as in Example 1. Properties of this polymer (sample 2) are summarized below in Table 1,

Examples 3-5

Interpolymers Linked to Acrylate Block Via Siloxane Units

The procedure from Example 1 again was essentially repeated. To the same type of reactor was added 1.69 kg hexane, 0.45 kg styrene solution, and 2.82 kg butadiene solution (21.2% in hexane). The reactor was charged with ~4.0 mL n-butyllithium solution, followed by 1.2 mL 2,2-bis(2'-tetrahydrofuryl)propane solution. The reactor jacket was heated to 50° C. and, after ~33 minutes, the batch temperature peaked at ~65° C.

After an additional ~30 minutes, ~6.5 mL H-3S solution (1.0 M in hexane) was added to the reactor. This polymer cement was agitated at 50° C. for another ~30 minutes before portions were transferred to glass bottles.

To the bottles were added sufficient amounts of a 4.2 M solution of MAPTMS so as to provide the following molar ratio of live polymer chain ends (derived from and based on the amount of initiator employed) to ethylenically unsaturated functional monomer):
 sample 3—1:1
 sample 4—1:5
 sample 5—1:10
These bottles were agitated for ~60 minutes in a 50° C. water bath before their respective contents were dropped (separately) into isopropanol containing BHT, coagulated, and drum dried similarly to the control polymer from Example 1.

Properties of these functionalized interpolymers, along with those of the non-functionalized control (sample 1), are summarized below in the following table.

TABLE 1

Properties of polymers from Examples 1-5

|  | 1 | 2 | 3 | 4 | 5 |
|---|---|---|---|---|---|
| $M_n$ (kg/mol) | 114 | 107 | 135 | 122 | 122 |
| $M_w/M_n$ | 1.04 | 1.04 | 1.27 | 1.29 | 1.15 |
| $M_p$ (kg/mol) | 119 | 113 | 116 | 116 | 115 |
| $T_g$ (° C.) | −42.7 | −42.3 | −42.8 | −42.0 | −42.8 |
| % coupling | 0.0 | 0.4 | 34.8 | 29.3 | 18.9 |

Examples 6-10

Filled Compositions and Vulcanizates

The polymers from the foregoing Examples were used to make filled compositions (compounds) using the formulations shown in Table 2a (carbon black as sole particulate filler) and Table 2b (silica as sole particulate filler) where N-phenyl-N'-(1,3-dimethylbutyl)-p-phenyl-enediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic compounds.

TABLE 2a

Carbon black compound formulation

| | Amount (phr) |
|---|---|
| Masterbatch | |
| synthesized polymer | 100 |
| carbon black (N343 type) | 50 |
| wax | 2 |
| 6PPD | 0.95 |
| stearic acid | 2 |
| black oil | 10 |
| Final | |
| sulfur | 1.5 |
| ZnO | 2.5 |
| TBBS | 0.5 |
| MBTS | 0.5 |
| DPG | 0.3 |
| TOTAL | 170.25 |

TABLE 2b

Silica compound formulation

| | Amount (phr) |
|---|---|
| Masterbatch | |
| synthetic polymer | 80 |
| natural rubber | 20 |

TABLE 2b-continued

Silica compound formulation

| | Amount (phr) |
|---|---|
| silica | 52.5 |
| wax | 2 |
| 6PPD | 0.95 |
| stearic acid | 2 |
| black oil | 10 |
| Re-mill | |
| 60% disulfide silane on carrier | 5 |
| silica | 2.5 |
| Final | |
| sulfur | 1.5 |
| ZnO | 2.5 |
| MBTS | 2.0 |
| TBBS | 0.7 |
| DPG | 1.4 |
| TOTAL | 183.05 |

Tables 3a (carbon black) and 3b (silica) below show results of physical testing on these compounds, as well as vulcanizates prepared by curing the compounds for ~15 minutes at 171° C. (For the "Temp. sweep" line, the top row of data are from measurements at 0° C. while the bottom row are from measurements at 60° C.) Mooney viscosity ($ML_{1+4}$) values were determined with an Alpha Technologies™ Mooney viscometer (large rotor) using a one-minute warm-up time and a four-minute running time; tensile mechanical properties were determined using the standard procedure described in ASTM-D412; Payne effect ($\Delta G'$, i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_X$ is modulus at X % elongation, $T_b$ is tensile strength at break, and $E_b$ is percent elongation at break.

TABLE 3a

Compound and vulcanizate properties (carbon black)

| | 6 | 7 | 8 | 9 | 10 |
|---|---|---|---|---|---|
| polymer | Ex. 1 | Ex. 2 | Ex. 3 | Ex. 4 | Ex. 5 |
| MDR2000 @ 171° C. (final) | | | | | |
| ML (kg·cm) | 2.85 | 1.14 | 1.50 | 1.59 | 1.50 |
| MH (kg·cm) | 17.20 | 17.79 | 16.60 | 17.11 | 16.97 |
| $t_{90}$ (min) | 4.44 | 6.12 | 5.47 | 5.04 | 5.79 |
| $ML_{1+4}$ @ 130° C. (final) | 20.5 | 25.7 | 31.7 | 33.9 | 32.8 |
| Tensile @ 23° C. (final, unaged) | | | | | |
| $M_{50}$ (MPa) | 1.84 | 1.86 | 1.74 | 1.84 | 1.85 |
| $M_{300}$ (MPa) | 12.36 | 12.50 | 13.00 | 13.72 | 13.81 |
| $T_b$ (MPa) | 14.7 | 13.2 | 17.6 | 16.9 | 17.8 |
| $E_b$ (%) | 347 | 313 | 386 | 356 | 378 |
| Tensile @ 100° C. (final, unaged) | | | | | |
| $M_{50}$ (MPa) | 1.41 | 1.61 | 1.45 | 1.51 | 1.51 |
| $M_{200}$ (MPa) | 6.24 | 7.02 | 6.58 | 6.87 | 6.97 |
| $T_b$ (MPa) | 8.5 | 7.1 | 8.4 | 8.2 | 9.6 |
| $E_b$ (%) | 257 | 205 | 243 | 231 | 260 |
| Strain sweep (60° C., 10 Hz, final) | | | | | |
| G' @ 5% strain (MPa) | 2.945 | 3.051 | 2.966 | 3.087 | 3.097 |
| G" @ 5% strain (MPa) | 0.670 | 0.700 | 0.589 | 0.612 | 0.632 |
| tan δ @ 5% strain | 0.2274 | 0.2295 | 0.1984 | 0.1984 | 0.2041 |
| $\Delta G'$ (MPa) | 3.790 | 3.798 | 2.650 | 2.877 | 3.018 |

TABLE 3a-continued

Compound and vulcanizate properties (carbon black)

| | 6 | 7 | 8 | 9 | 10 |
|---|---|---|---|---|---|
| Temp. sweep (2% strain, 10 Hz, final) | | | | | |
| G' (MPa) | 2.945 | 3.051 | 2.966 | 3.087 | 3.097 |
| | 13.251 | 14.239 | 14.227 | 14.728 | 14.379 |
| G'' (MPa) | 4.470 | 5.084 | 5.625 | 5.814 | 5.707 |
| | 1.150 | 1.221 | 1.125 | 1.149 | 1.143 |
| tan δ | 0.3373 | 0.3557 | 0.3954 | 0.3944 | 0.3966 |
| | 0.2254 | 0.2328 | 0.2257 | 0.2224 | 0.2291 |
| Peak tan δ | 0.7855 | 0.7704 | 0.7924 | 0.7848 | 0.7828 |
| Dynastat tan δ (60° C., final) | 0.2122 | 0.2168 | 0.1845 | 0.1899 | 0.1911 |
| Bound rubber (%) | 11.8 | 10.7 | — | — | — |

TABLE 3B

Compound and vulcanizate properties (silica)

| | 6 | 7 | 8 | 9 | 10 |
|---|---|---|---|---|---|
| polymer | Ex. 1 | Ex. 2 | Ex. 3 | Ex. 4 | Ex. 5 |
| MDR2000 @ 171° C. (final) | | | | | |
| ML (kg · cm) | 1.64 | 2.08 | 2.22 | 1.84 | 2.11 |
| MH (kg · cm) | 23.24 | 16.26 | 16.57 | 16.50 | 16.97 |
| $t_{90}$ (min) | 6.73 | 8.12 | 6.98 | 6.18 | 5.55 |
| $ML_{1+4}$ @ 130° C. (final) | 18.6 | 44.6 | 42.9 | 38.9 | 41.5 |
| Tensile @ 23° C. (final, unaged) | | | | | |
| $M_{50}$ (MPa) | 2.07 | 1.49 | 1.46 | 1.47 | 1.54 |
| $M_{200}$ (MPa) | 7.79 | 8.07 | 7.71 | 8.26 | 8.07 |
| $T_b$ (MPa) | 13.1 | 10.9 | 16.8 | 16.4 | 14.7 |
| $E_b$ (%) | 301 | 241 | 321 | 303 | 293 |
| Tensile @ 100° C. (final, unaged) | | | | | |
| $M_{50}$ (MPa) | 1.92 | 1.50 | 1.49 | 1.50 | 1.54 |
| $M_{100}$ (MPa) | 3.39 | 2.91 | 2.89 | 2.95 | 3.03 |
| $T_b$ (MPa) | 6.5 | 5.6 | 6.6 | 6.4 | 5.6 |
| $E_b$ (%) | 185 | 162 | 184 | 174 | 163 |
| Strain sweep (60° C., 10 Hz, final) | | | | | |
| G' @ 5% strain (MPa) | 4.058 | 1.849 | 2.252 | 2.278 | 2.436 |
| G'' @ 5% strain (MPa) | 0.658 | 0.143 | 0.181 | 0.166 | 0.184 |
| tan δ @ 5% strain | 0.1622 | 0.0772 | 0.0803 | 0.0730 | 0.0756 |
| ΔG' (MPa) | 4.964 | 0.256 | 0.407 | 0.377 | 0.438 |
| Temp. sweep (2% strain, 10 Hz, final) | | | | | |
| G' (MPa) | 14.429 | 5.026 | 4.641 | 4.258 | 4.517 |
| | 7.656 | 2.702 | 2.772 | 2.617 | 2.736 |
| G'' (MPa) | 4.213 | 1.734 | 1.339 | 0.296 | 0.297 |
| | 1.060 | 0.212 | 0.193 | 0.168 | 0.191 |
| tan δ | 0.2908 | 0.3420 | 0.2877 | 0.2958 | 0.2971 |
| | 0.1385 | 0.0783 | 0.0694 | 0.0644 | 0.0699 |
| Peak tan δ | 0.7338 | 1.0133 | 1.0628 | 1.1554 | 1.1087 |
| Dynastat tan δ (60° C., final) | 0.1262 | 0.0706 | 0.0698 | 0.0636 | 0.0677 |
| Bound rubber (%) | 20.5 | 86.5 | — | — | — |

That which is claimed is:

1. A method for providing a polymer with a terminal block, said method comprising:
    a) anionically initiating polymerization of a monomer system that comprises at least one type of polyene so as to provide a plurality of living polymer chains, each of said chains comprising polyene mer,
    b) reacting at least some of said living polymer chains with one or more cyclic compounds so as to provide terminally functionalized living polymer chains, the ring structure of each of said one or more cyclic compounds comprising silicon atoms alternating with O, S or N atoms, and
    c) reacting said terminally functionalized living polymer chains with a sufficient amount of one or more ethylenically unsaturated functional monomers so as to provide a terminal block that includes up to about 100 mer units derived from said one or more functional monomers, thereby providing said polymer with a terminal block.

2. The method of claim 1 wherein said initiating step involves an alkali metal atom containing compound.

3. The method of claim 2 wherein said compound further comprises a heteroatom containing functional group.

4. The method of claim 2 wherein said one or more cyclic compounds comprising silicon atoms is added at about a 1:1 molar ratio relative to said alkali metal atom containing compound.

5. The method of claim 4 wherein said one or more cyclic compounds comprising silicon atoms comprises a cyclic polysiloxane.

6. The method of claim 4 wherein said one or more cyclic compounds comprising silicon atoms comprises a compound defined by the formula

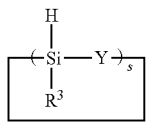

where s is 3 or 4, Y is an O or S atom, and $R^3$ is a substituted or unsubstituted hydrocarbyl group that is free of active hydrogen atoms.

7. The method of claim 4 wherein said one or more cyclic compounds comprising silicon atoms comprises a compound defined by the formula

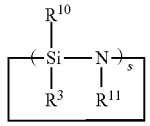

where s is 3 or 4, $R^3$ is a substituted or unsubstituted hydrocarbyl group that is free of active hydrogen atoms, and one of $R^{10}$ and $R^{11}$ is a hydrogen atom and the other is a hydrocarbyl group with the proviso that, where $R^{11}$ is H, $R^{10}$ can be $R^3$.

8. The method of claim 2 wherein said one or more ethylenically unsaturated functional monomers is added at a molar ratio of up to about 10:1 relative to the amount of said alkali metal atom containing compound.

9. The method of claim 1 wherein said one or more ethylenically unsaturated functional monomers comprises at least one compound defined by the general formula

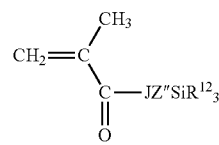

where $Z''$ is a single bond or a hydrocarbyl group; each $R^{12}$ independently is an alkyl or alkoxy group; and J is an oxygen atom or $NR^{13}$ group where $R^{13}$ is a hydrogen atom or hydrocarbyl group.

10. The method of any of claims 1 to 9 further comprising recovering said polymer with a terminal block from solution.

* * * * *